United States Patent
Kook et al.

(10) Patent No.: US 9,989,126 B2
(45) Date of Patent: Jun. 5, 2018

(54) PLANETARY GEAR TRAIN OF AUTOMATIC TRANSMISSION FOR VEHICLE

(71) Applicant: Hyundai Motor Company, Seoul (KR)

(72) Inventors: Jae Chang Kook, Hwaseong-si (KR); Hyun Sik Kwon, Seoul (KR); Seongwook Ji, Gunpo-si (KR); Wonmin Cho, Hwaseong-si (KR); Wookjin Jang, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days. days.

(21) Appl. No.: 15/333,866

(22) Filed: Oct. 25, 2016

(65) Prior Publication Data

US 2018/0003269 A1     Jan. 4, 2018

(30) Foreign Application Priority Data

Jun. 30, 2016 (KR) ........................ 10-2016-0082640

(51) Int. Cl.
*F16H 3/66* (2006.01)

(52) U.S. Cl.
CPC ....... *F16H 3/66* (2013.01); *F16H 2200/0065* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS 9,182,014 B2    11/2015   Beck et al.
9,371,891 B2     6/2016   Beck et al.

FOREIGN PATENT DOCUMENTS

| DE | 102009025610 A1 | * | 12/2010 | ............... F16H 3/66 |
| DE | 102009028707 A1 | * | 2/2011 | ............... F16H 3/66 |
| DE | 102009028711 A1 | * | 2/2011 | ............... F16H 3/66 |

* cited by examiner

*Primary Examiner* — Dirk Wright
(74) *Attorney, Agent, or Firm* — Morgan, Lewis & Bockius LLP

(57) ABSTRACT

A planetary gear train of an automatic transmission for a vehicle may include an input shaft receiving torque of an engine, an output shaft outputting torque, a first planetary gear set, a second planetary gear set, a third planetary gear set, a fourth planetary gear set, a first shaft, a second shaft, a third shaft, a fourth shaft, a fifth shaft selectively connectable to the second shaft, a sixth shaft connected to the input shaft, and selectively connectable to each of the third shaft and the fourth shaft, a seventh shaft connected to the output shaft, and an eighth shaft.

10 Claims, 4 Drawing Sheets

FIG. 2

| speed stages | control element | | | | | | gear ratio |
|---|---|---|---|---|---|---|---|
| | C1 | C2 | C3 | B1 | B2 | B3 | |
| D1 | | ● | | | | ● | 4.286 |
| D2 | ● | | | ● | | ● | 2.571 |
| D3 | ● | ● | | | | ● | 1.714 |
| D4 | ● | | ● | | | ● | 1.298 |
| D5 | ● | ● | ● | | | | 1.000 |
| D6 | ● | | ● | ● | | | 0.808 |
| D7 | | ● | ● | ● | | | 0.700 |
| D8 | | | ● | ● | ● | | 0.583 |
| D9 | | ● | ● | | ● | | 0.483 |
| REV | | ● | | | ● | ● | -3.429 |

FIG. 4

| speed stages | control element | | | | | | gear ratio |
|---|---|---|---|---|---|---|---|
| | C1 | C2 | C3 | B1 | B2 | B3 | |
| D1 | | ● | | ● | | ● | 4.848 |
| D2 | ● | | | ● | | ● | 2.909 |
| D3 | ● | ● | | | | ● | 2.000 |
| D4 | ● | ● | ● | | | ● | 1.400 |
| D5 | ● | ● | ● | | | | 1.000 |
| D6 | ● | | ● | ● | | | 0.828 |
| D7 | | ● | ● | ● | | | 0.719 |
| D8 | | | ● | ● | ● | | 0.600 |
| D9 | | ● | ● | | ● | | 0.505 |
| REV | | ● | | | ● | ● | -4.267 |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2016-0082640, filed Jun. 30, 2016, the entire contents of which is incorporated herein for all purposes by this reference.

BACKGROUND OF THE INVENTION

Field of the Invention

The present invention relates to an automatic transmission for a vehicle. More particularly, to a planetary gear train of an automatic transmission for a vehicle that improves power delivery performance and fuel economy by achieving nine forward speed stages with a minimum number of constituent elements being used, and improves silent driving of the vehicle by using an operation point positioned at a low engine speed.

Description of Related Art

Generally, an automatic transmission achieving more speed stages has been developed to enhance fuel economy and optimize drivability. Recent increases of oil prices are triggering stiff competition in enhancing fuel consumption of a vehicle.

Therefore, much research for reducing weight and enhancing fuel economy through downsizing of an engine and for securing drivability and fuel economy through multiple speed stages of automatic transmissions has been developed.

However, in the automatic transmission, as the number of speed stages increase, the number of internal components (particularly, planetary gear sets) increase, and as a result, a lengh of the transmission increases. This may deteriorate installability and/or power flow efficiency and may increase production cost, and weight.

Accordingly, development of a planetary gear train which may achieve maximum efficiency with a small number of components is important in order to increase a fuel economy enhancement effect through the multiple-speeds.

In this aspect, in recent years, 8-speed automatic transmissions tend to be implemented and the research and development of a planetary gear train capable of implementing more speed stages has also been actively conducted.

However, a conventional 8-speed automatic transmission typically includes three to four planetary gear sets and five to six control elements (frictional elements). In this case, since the length of the automatic transmission increases, mountability may deteriorate.

In recent planetary gear sets, one planetary gear set is disposed above another planetary gear set, but structures of automatic transmissions to which parallel planetary gear sets is applied are very limited.

In other planetary gear sets, dog clutches instead of control elements of wet-type are used. However, shift feel may deteriorate.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving power delivery performance and fuel economy by achieving at least nine forward speed stages and one reverse speed stage.

Various aspects of the present invention are additionally directed to providing a planetary gear train of an automatic transmission for a vehicle having further advantages of improving silent driving of the vehicle by using an operation point positioned at a low rotational speed region of an engine.

According to various aspects of the present invention, a planetary gear train of an automatic transmission for a vehicle may include an input shaft receiving torque of an engine, an output shaft outputting torque, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, a first shaft connecting the first rotation element to the fourth rotation element, a second shaft connecting the second rotation element to the twelfth rotation element, a third shaft connecting the third rotation element to the fifth rotation element, a fourth shaft connected to the sixth rotation element, a fifth shaft connected to the seventh rotation element and selectively connectable to the second shaft, a sixth shaft connected to the eighth rotation element, connected to the input shaft, and selectively connectable to each of the third shaft and the fourth shaft, a seventh shaft connecting the ninth rotation element to the eleventh rotation element and connected to the output shaft, and an eighth shaft connected to the tenth rotation element.

The first shaft and the eighth shaft may be selectively connectable to a transmission housing, and the third shaft may be selectively connectable to the transmission housing in a state of being disconnected from the sixth shaft.

The first, second, and third rotation elements may be a first sun gear, a first planet carrier, and a first ring gear, the fourth, fifth, and sixth rotation elements may be a second sun gear, a second planet carrier, and a second ring gear, the seventh, eighth, and ninth rotation elements may be a third sun gear, a third planet carrier, and a third ring gear, and the tenth, eleventh, and twelfth rotation elements may be a fourth sun gear, a fourth planet carrier, and a fourth ring gear.

The first, second, and third rotation elements may be a first sun gear, a first planet carrier, and a first ring gear, the fourth, fifth, and sixth rotation elements may be a second sun gear, a second planet carrier, and a second ring gear, the seventh, eighth, and ninth rotation elements may be a third sun gear, a third planet carrier, and a third ring gear, and the tenth, eleventh, and twelfth rotation elements may be a fourth planet carrier, a fourth ring gear, and a fourth sun gear, respectively.

The planetary gear train may further include a first clutch selectively connecting the third shaft to the sixth shaft, a second clutch selectively connecting the fourth shaft to the sixth shaft, a third clutch selectively connecting the second shaft to the fifth shaft, a first brake selectively connecting the first shaft to the transmission housing, a second brake selectively connecting the third shaft to the transmission housing, and a third brake selectively connecting the eighth shaft to the transmission housing.

According to various aspects of the present invention, a planetary gear train of an automatic transmission for a vehicle may include an input shaft receiving torque of an engine, an output shaft outputting torque, a first planetary gear set including first, second, and third rotation elements, a second planetary gear set including fourth, fifth, and sixth rotation elements, a third planetary gear set including seventh, eighth, and ninth rotation elements, and a fourth planetary gear set including tenth, eleventh, and twelfth rotation elements, in which the input shaft may be connected to the eighth rotation element, the output shaft may be connected to the ninth rotation element, the first rotation element may be connected to the fourth rotation element, the second rotation element may be connected to the twelfth rotation element, the third rotation element may be connected to the fifth rotation element and may be selectively connectable to the eighth rotation element, the sixth rotation element may be selectively connectable to the eighth rotation element, and the ninth rotation element may be connected to the eleventh rotation element.

The fourth rotation element and the tenth rotation element may each be selectively connectable to a transmission housing, and the fifth rotation element may be selectively connectable to the transmission housing in a state of being disconnected from the eighth rotation element.

The planetary gear train may further include a first clutch selectively connecting the third rotation element to the eighth rotation element, a second clutch selectively connecting the sixth rotation element to the eighth rotation element, a third clutch selectively connecting the second rotation element to the seventh rotation element, a first brake selectively connecting the fourth rotation element to the transmission housing, a second brake selectively connecting the fifth rotation element to the transmission housing, and a third brake selectively connecting the tenth rotation element to the transmission housing.

The planetary gear train according to various embodiments of the present invention may achieve nine forward speed stages and one reverse speed stage by combining four planetary gear sets with six control elements.

In addition, the planetary gear train according to various embodiments of the present invention may achieve speed stages suitable to a rotational speed of the engine due to multiple-speed stages of the automatic transmission. Particularly, silent driving of the vehicle may be improved by using an operation point positioned at a low rotational speed region of an engine.

Furthermore, the planetary gear train according to various embodiments of the present invention may maximize driving efficiency of the engine and may improve power delivery performance and fuel consumption.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of control elements at each speed stage in the planetary gear train according to various embodiments of the present invention.

FIG. 4 is an operation chart of control elements at each speed stage in the planetary gear train according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
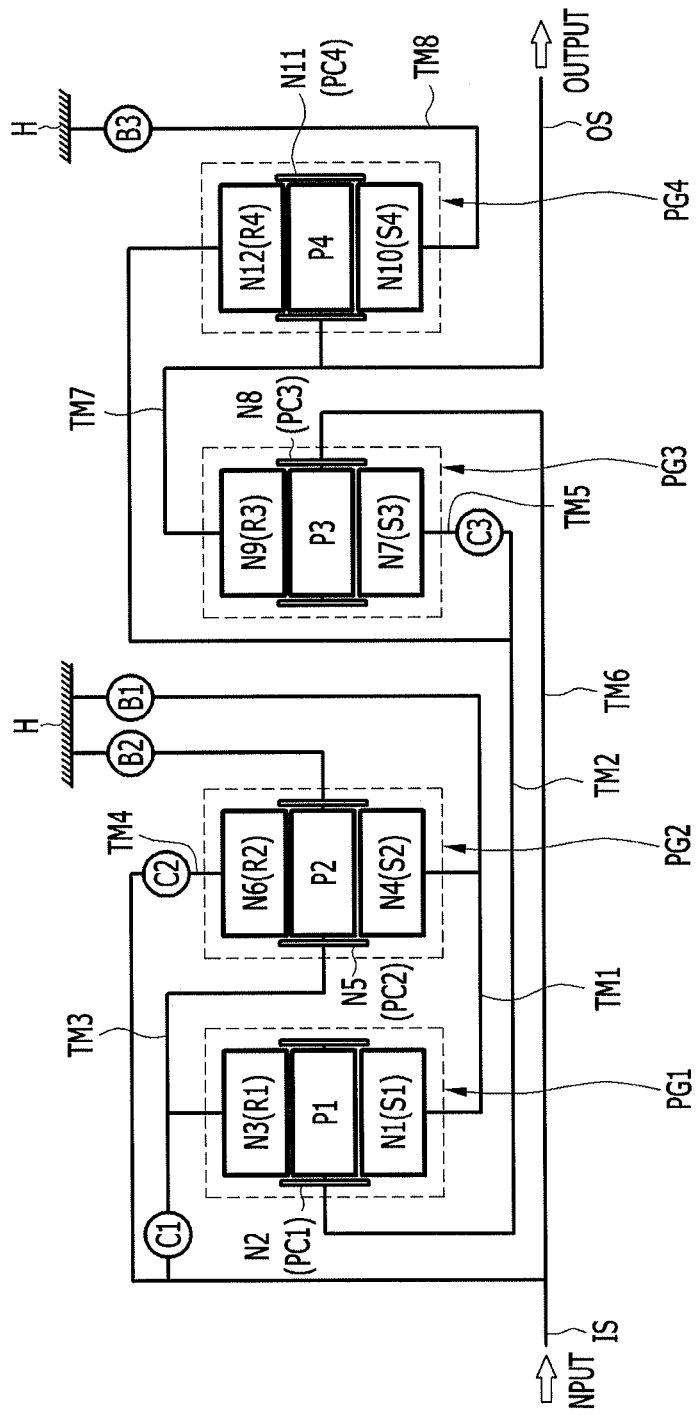
FIG. 1 is a schematic diagram of a planetary gear train according to various embodiments of the present invention.

FIG. 1 is a schematic diagram of a planetary gear train according to various embodiments of the present invention.

Referring to FIG. 1, a planetary gear train according to various embodiments of the present invention includes first, second, third, and fourth planetary gear sets PG1, PG2, PG3, and PG4 disposed on the same axis, an input shaft IS, an output shaft OS, eight rotation shafts TM1 to TM8, each connected to at least one rotation element of the first, second, third, and fourth planetary gear sets PG1, PG2, PG3, and PG4, three clutches C1 to C3 and three brakes B1 to B3 that are control elements, and a transmission housing H.

Torque input from the input shaft IS is changed by cooperation of the first, second, third, and fourth planetary gear sets PG1, PG2, PG3, and PG4 and the changed torque is output through the output shaft OS.

The planetary gear sets are disposed in the order of the first, second, third and fourth planetary gear sets PG1, PG2, PG3 and PG4 from an engine side.

The input shaft IS is an input member and the torque from a crankshaft of an engine, after being torque-converted through a torque converter, is input into the input shaft IS.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 respectively as tenth, eleventh, and twelfth rotation elements N10, N11, and N12.

The first rotation element N1 is directly connected to the fourth rotation element N4, the second rotation element N2 is directly connected to the twelfth rotation element N12, the third rotation element N3 is directly connected to the fifth rotation element N5, and the ninth rotation element N9 is directly connected to the eleventh rotation element N11 such that the first, second, third, and fourth planetary gear sets PG1, PG2, PG3, and PG4 include eight shafts TM1 to TM8.

The eight shafts TM1 to TM8 will be described in further detail.

The eight shafts TM1 to TM8 directly connects a plurality of rotation elements among the rotation elements of the planetary gear sets PG1, PG2, PG3, and PG4, are rotation members that are directly connected to at least one rotation element of the planetary gear sets PG1, PG2, PG3, and PG4 and rotate with the at least one rotation element to transmit torque, or are fixed members that directly connect at least one rotation element of the planetary gear sets PG1, PG2, PG3, and PG4 to the transmission housing H to fix the at least one rotation element.

The first shaft TM1 directly connects the first rotation element N1 (first sun gear S1) to the fourth rotation element N4 (second sun gear S2) and is selectively connectable to the transmission housing H to be operated as a selective fixed element.

The second shaft TM2 directly connects the second rotation element N2 (first planet carrier PC1) to the twelfth rotation element N12 (fourth ring gear R4).

The third shaft TM3 directly connects the third rotation element N3 (first ring gear R1) to the fifth rotation element N5 (second planet carrier PC2) and is selectively connectable to the transmission housing H to be operated as a selective fixed element.

The fourth shaft TM4 is directly connected to the sixth rotation element N6 (second ring gear R2).

The fifth shaft TM5 is directly connected to the seventh rotation element N7 (third sun gear S3) and is selectively connectable to the second shaft TM2.

The sixth shaft TM6 is directly connected to the eighth rotation element N8 (third planet carrier PC3), is directly connected to the input shaft IS to be continuously operated as an input element, and is selectively connectable to the third shaft TM3 and the fourth shaft TM4.

The seventh shaft TM7 directly connects the ninth rotation element N9 (third ring gear R3) to the eleventh rotation element N11 (fourth planet carrier PC4) and is directly connected to the output shaft OS to be continuously operated as an output element.

The eighth shaft TM8 is directly connected to the tenth rotation element N10 (fourth sun gear S4) and is selectively connectable to the transmission housing H to be operated as a selective fixed element.

Herein, the third shaft TM3 is selectively connectable to the sixth shaft TM6 directly connected to the input shaft IS so as to be operated as an input element, or is selectively connectable to the transmission housing H to be operated as the fixed element. Therefore, third shaft TM3 is not connected to the sixth shaft TM6 and the transmission housing H.

In addition, three clutches C1, C2, and C3 are disposed at portions at which at least two shafts among the eight shafts TM1 to TM8 including the input shaft IS and the output shaft OS are selectively connectable to each other.

In addition, three brakes B1, B2, and B3 are disposed at portions at which at least one shaft among the eight shafts TM1 to TM8 is selectively connectable to the transmission housing H.

Arrangements of the three clutches C1 to C3 and the three brakes B1 to B3 are described in detail.

The first clutch C1 is disposed between the third shaft TM3 and the sixth shaft TM6 and selectively connects the third shaft TM3 to the sixth shaft TM6.

The second clutch C2 is disposed between the fourth shaft TM4 and the sixth shaft TM6 and selectively connects the fourth shaft TM4 to the sixth shaft TM6.

The third clutch C3 is disposed between the second shaft TM2 and the fifth shaft TM5 and selectively connects the second shaft TM2 to the fifth shaft TM5.

The first brake B1 is disposed between the first shaft TM1 and the transmission housing H and selectively connects the first shaft TM1 to the transmission housing H.

The second brake B2 is disposed between the third shaft TM3 and the transmission housing H and selectively connects the third shaft TM3 to the transmission housing H.

The third brake B3 is disposed between the eighth shaft TM8 and the transmission housing H and selectively connects the eighth shaft TM8 to the transmission housing H.

Referring to FIG. 1, the first clutch C1 and the second brake B2 selectively connects the third shaft TM3 to the sixth shaft TM6 directly connected to the input shaft IS and the transmission housing H, respectively. Therefore, both of the first clutch C1 and the second brake B2 are not operated at each speed stage.

The control elements including the first, second, and third clutches C1, C2, and C3 and the first, second, and third brakes B1, B2, and B3 may be multi-plates friction elements of wet type that are operated by hydraulic pressure.

FIG. 2 is an operation chart of control elements at each speed stage in the planetary gear train according to the first exemplary embodiment of the present invention.

As shown in FIG. 2, three control elements among the first, second, and third clutches C1, C2, and C3 and the first, second, and third brakes B1, B2, and B3 that are control elements are operated at each speed stage in the planetary gear train according to the first exemplary embodiment of the present invention.

The second clutch C2 and the first and third brakes B1 and B3 are operated at a first forward speed stage D1.

In a state that the fourth shaft TM4 is connected to the sixth shaft TM6 by operation of the second clutch C2, a rotation speed of the input shaft IS is input to the sixth shaft TM6 and the fourth shaft TM4. In addition, the first shaft TM1 and the eighth shaft TM8 are operated as the fixed elements by operation of the first and third brakes B1 and B3. Therefore, the rotation speed of the input shaft IS is shifted into the first forward speed stage, and the first forward speed stage is output through the output shaft OS connected to the seventh shaft TM7.

The first clutch C1 and the first and third brakes B1 and B3 are operated at a second forward speed stage D2.

In a state that the third shaft TM3 is connected to the sixth shaft TM6 by operation of the first clutch C1, the rotation speed of the input shaft IS is input to the sixth shaft TM6 and the third shaft TM3. In addition, the first shaft TM1 and the eighth shaft TM8 are operated as the fixed elements by operation of the first and third brakes B1 and B3

Therefore, the rotation speed of the input shaft IS is shifted into the second forward speed stage, and the second forward speed stage is output through the output shaft OS connected to the seventh shaft TM7.

The first and second clutches C1 and C2 and the third brake B3 are operated at a third forward speed stage D3.

In a state that the third shaft TM3 is connected to the sixth shaft TM6 by operation of the first clutch C1 and the fourth shaft TM4 is connected to the sixth shaft TM6 by operation of the second clutch C2, the rotation speed of the input shaft IS is input to the sixth shaft TM6, the third shaft TM3, and the fourth shaft TM4. In addition, the eighth shaft TM8 is operated as the fixed element by operation of the third brake B3. Therefore, the rotation speed of the input shaft IS is shifted into the third forward speed stage, and the third forward speed stage is output through the output shaft OS connected to the seventh shaft TM7.

The first and third clutches C1 and C3 and the third brake B3 are operated at a fourth forward speed stage D4.

In a state that the third shaft TM3 is connected to the sixth shaft TM6 by operation of the first clutch C1 and the second shaft TM2 is connected to the fifth shaft TM5 by operation of the third clutch C3, the rotation speed of the input shaft IS is input to the sixth shaft TM6 and the third shaft TM3. In addition, the eighth shaft TM8 is operated as the fixed element by operation of the third brake B3

Therefore, the rotation speed of the input shaft IS is shifted into the fourth forward speed stage, and the fourth forward speed stage is output through the output shaft OS connected to the seventh shaft TM7.

The first, second, and third clutches C1, C2, and C3 are operated at a fifth forward speed stage D5.

The third shaft TM3 is connected to the sixth shaft TM6 by operation of the first clutch C1, the fourth shaft TM4 is connected to the sixth shaft TM6 by operation of the second clutch C2, and the second shaft TM2 is connected to the fifth shaft TM5 by operation of the third clutch C3 such that all of the first, second, third, and fourth planetary gear sets PG1, PG2, PG3, and PG4 become lock-up states. At this state, the rotation speed of the input shaft IS is input to the sixth shaft TM6, the third shaft TM3, and the fourth shaft TM4. Therefore, the rotation speed of the input shaft IS is output through the output shaft OS connected to the seventh shaft TM7 as the fifth forward speed stage.

The first and third clutches C1 and C3 and the first brake B1 are operated at a sixth forward speed stage D6.

In a state that the third shaft TM3 is connected to the sixth shaft TM6 by operation of the first clutch C1 and the second shaft TM2 is connected to the fifth shaft TM5 by operation of the third clutch C3, the rotation speed of the input shaft IS is input to the sixth shaft TM6 and the third shaft TM3. In addition, the first shaft TM1 is operated as the fixed element by operation of the first brake B1. Therefore, the rotation speed of the input shaft IS is shifted into the sixth forward speed stage, and the sixth forward speed stage is output through the output shaft OS connected to the seventh shaft TM7.

The second and third clutches C2 and C3 and the first brake B1 are operated at a seventh forward speed stage D7.

In a state that the fourth shaft TM4 is connected to the sixth shaft TM6 by operation of the second clutch C2 and the second shaft TM2 is connected to the fifth shaft TM5 by operation of the third clutch C3, the rotation speed of the input shaft IS is input to the sixth shaft TM6 and the fourth shaft TM4. In addition, the first shaft TM1 is operated as the fixed element by operation of the first brake B1. Therefore, the rotation speed of the input shaft IS is shifted into the seventh forward speed stage, and the seventh forward speed stage is output through the output shaft OS connected to the seventh shaft TM7.

The third clutch C3 and the first and second brakes B1 and B2 are operated at an eighth forward speed stage D8.

In a state that the second shaft TM2 is connected to the fifth shaft TM5 by operation of the third clutch C3, the rotation speed of the input shaft IS is input to the sixth shaft TM6. In addition, the first shaft TM1 and the third shaft TM3 are operated as the fixed elements by operation of the first and second brakes B1 and B2. Therefore, the rotation speed of the input shaft IS is shifted into the eighth forward speed stage, and the eighth forward speed stage is output through the output shaft OS connected to the seventh shaft TM7.

The second and third clutches C2 and C3 and the second brake B2 are operated at a ninth forward speed stage D9.

In a state that the fourth shaft TM4 is connected to the sixth shaft TM6 by operation of the second clutch C2 and the second shaft TM2 is connected to the fifth shaft TM5 by operation of the third clutch C3, the rotation speed of the input shaft IS is input to the sixth shaft TM6 and the fourth shaft TM4. In addition, the third shaft TM3 is operated as the fixed element by operation of the second brake B2. Therefore, the rotation speed of the input shaft IS is shifted into the ninth forward speed stage, and the ninth forward speed stage is output through the output shaft OS connected to the seventh shaft TM7.

The second clutch C2 and the second and third brakes B2 and B3 are operated at a reverse speed state REV.

In a state that the fourth shaft TM4 is connected to the sixth shaft TM6 by operation of the second clutch C2, the rotation speed of the input shaft IS is input to the sixth shaft TM6 and the fourth shaft TM4. In addition, the third shaft TM3 and the eighth shaft TM8 are operated as the fixed elements by operation of the second and third brakes B2 and B3. Therefore, the rotation speed of the input shaft IS is shifted into the reverse speed stage, and the reverse speed stage is output through the output shaft OS connected to the seventh shaft TM7 as an inverse rotation speed.

Figure 3:
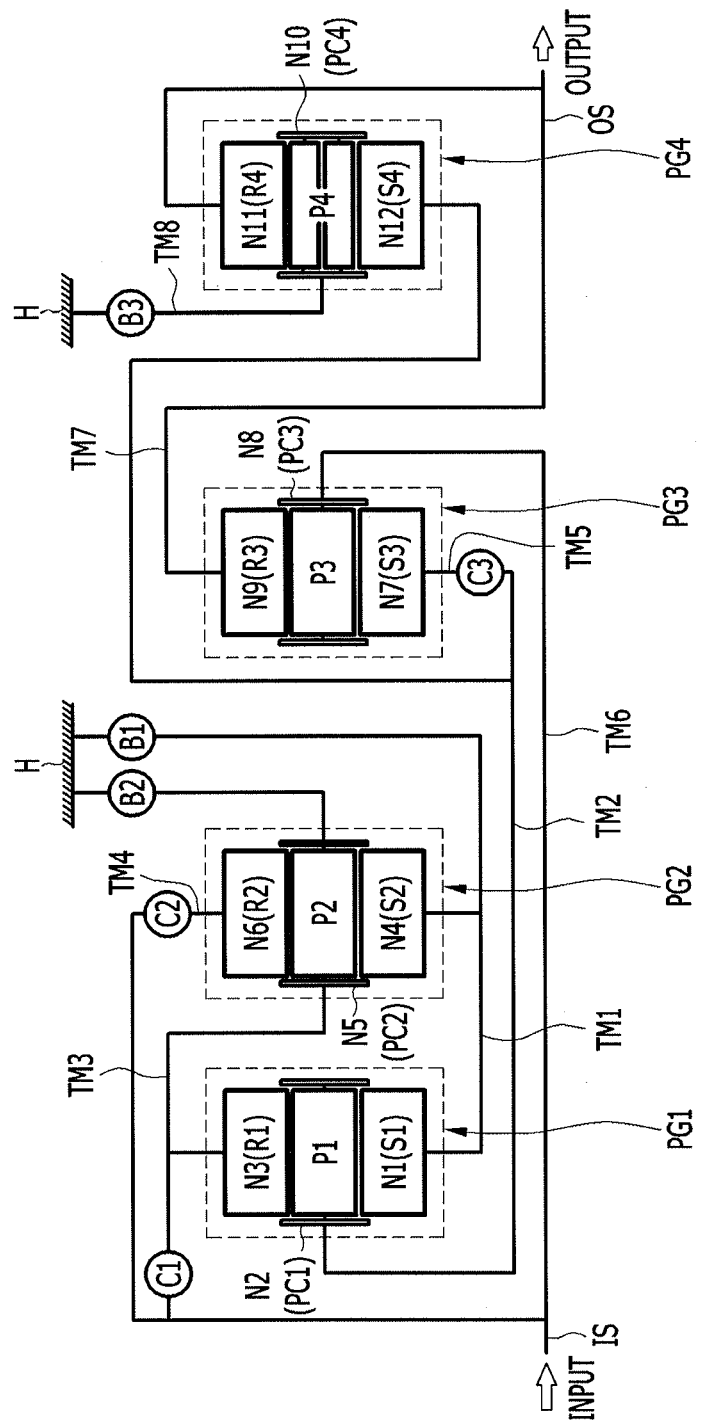
FIG. 3 is a schematic diagram of a planetary gear train according to various embodiments of the present invention.

FIG. 3 is a schematic diagram of a planetary gear train according to a second exemplary embodiment of the present invention, and FIG. 4 is an operation chart of control elements at each speed stage in the planetary gear train according to a second exemplary embodiment of the present invention.

Referring to FIG. 1 and FIG. 3, the fourth planetary gear set PG4 is the single pinion planetary gear set, the tenth rotation element TM10 is the fourth sun gear S4, the eleventh rotation element TM11 is the fourth planet carrier PC4, and the twelfth rotation element TM12 is the fourth ring gear R4 in the planetary gear train according to the first exemplary embodiment of the present invention. However, the fourth planetary gear set PG4 is a double pinion planetary gear set, the tenth rotation element TM10 is the fourth planet carrier PC4, the eleventh rotation element TM11 is the fourth ring gear R4, and the twelfth rotation element TM12 is the fourth sun gear S4 in the planetary gear train according to the second exemplary embodiment.

A type of the fourth planetary gear set PG4 according to the second exemplary embodiment is different from that according to the first exemplary embodiment, but connections between the eight shafts TM1 to TM8 and the control elements according to the second exemplary embodiment are the same as those according to the first exemplary embodiment. Since operation and effect of the planetary gear train according to the second exemplary embodiment are the same as those according to the first exemplary embodiment, detailed description will be omitted.

Referring to FIG. 4, an operational chart of the control elements at each speed stage in the second exemplary embodiment is the same as that in the first exemplary embodiment, but gear ratios between neighboring speed stages according to the second exemplary embodiment are different from those according to the first exemplary embodiment. Since differences in the gear ratios are not caused by the operation and the effect of the planetary gear train, detailed description will be omitted.

The planetary gear trains according to the first and second exemplary embodiments of the present invention may achieve at least nine forward speed stages and one reverse speed stage by combining four planetary gear sets PG1, PG2, PG3, and PG4 with the three clutches C1, C2, and C3 and the three brakes B1, B2, and B3.

In addition, the planetary gear train according to the exemplary embodiments of the present invention may achieve suitable speed stages according to rotation speed of the engine. Particularly, silent driving of the vehicle may be improved by using operation point positioned at a low rotational speed region of the engine.

In addition, since linearity of step ratios is secured, drivability such as acceleration before and after shift, rhythmical engine speed, and so on may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle comprising:
   an input shaft receiving torque of an engine;
   an output shaft outputting torque;
   a first planetary gear set including a first rotation element, a second rotation element, and a third rotation element;
   a second planetary gear set including a fourth rotation element, a fifth rotation element, and a sixth rotation element;
   a third planetary gear set including a seventh rotation element, an eighth rotation element, and a ninth rotation element;
   a fourth planetary gear set including a tenth rotation element, an eleventh rotation element, and a twelfth rotation element;
   a first shaft connecting the first rotation element to the fourth rotation element;
   a second shaft connecting the second rotation element to the twelfth rotation element;
   a third shaft connecting the third rotation element to the fifth rotation element;
   a fourth shaft connected to the sixth rotation element;
   a fifth shaft connected to the seventh rotation element and selectively connectable to the second shaft;
   a sixth shaft connected to the eighth rotation element, connected to the input shaft, and selectively connectable to each of the third shaft and the fourth shaft;
   a seventh shaft connecting the ninth rotation element to the eleventh rotation element and connected to the output shaft; and
   an eighth shaft connected to the tenth rotation element.

2. The planetary gear train of claim 1, wherein the first shaft and the eighth shaft are selectively connectable to a transmission housing, and
   the third shaft is selectively connectable to the transmission housing in a state of being disconnected from the sixth shaft.

3. The planetary gear train of claim 1, wherein the first rotation element, the second rotation element, and the third rotation element are a first sun gear, a first planet carrier, and a first ring gear,
   the fourth rotation element, the fifth rotation element, and the sixth rotation element are a second sun gear, a second planet carrier, and a second ring gear,
   the seventh rotation element, the eighth rotation element, and the ninth rotation element are a third sun gear, a third planet carrier, and a third ring gear, and
   the tenth rotation element, the eleventh rotation element, and the twelfth rotation element are a fourth sun gear, a fourth planet carrier, and a fourth ring gear, respectively.

4. The planetary gear train of claim 1, wherein the first rotation element, the second rotation element, and the third rotation element are a first sun gear, a first planet carrier, and a first ring gear,
   the fourth rotation element, the fifth rotation element, and the sixth rotation element are a second sun gear, a second planet carrier, and a second ring gear,
   the seventh rotation element, the eighth rotation element, and the ninth rotation element are a third sun gear, a third planet carrier, and a third ring gear, and
   the tenth rotation element, the eleventh rotation element, and the twelfth rotation element are a fourth planet carrier, a fourth ring gear, and a fourth sun gear, respectively.

5. The planetary gear train of claim 2, further comprising:
   a first clutch selectively connecting the third shaft to the sixth shaft;
   a second clutch selectively connecting the fourth shaft to the sixth shaft;
   a third clutch selectively connecting the second shaft to the fifth shaft;
   a first brake selectively connecting the first shaft to the transmission housing;
   a second brake selectively connecting the third shaft to the transmission housing; and a third brake selectively connecting the eighth shaft to the transmission housing.

6. A planetary gear train of an automatic transmission for a vehicle comprising:
an input shaft receiving torque of an engine;
an output shaft outputting torque;
a first planetary gear set including a first rotation element, a second rotation element, and a third rotation element;
a second planetary gear set including a fourth rotation element, a fifth rotation element, and a sixth rotation element;
a third planetary gear set including a seventh rotation element, an eighth rotation element, and a ninth rotation element; and
a fourth planetary gear set including a tenth rotation element, an eleventh rotation element, and a twelfth rotation element,
wherein the input shaft is connected to the eighth rotation element,
the output shaft is connected to the ninth rotation element,
the first rotation element is connected to the fourth rotation element,
the second rotation element is connected to the twelfth rotation element,
the third rotation element is connected to the fifth rotation element and is selectively connectable to the eighth rotation element,
the sixth rotation element is selectively connectable to the eighth rotation element, and
the ninth rotation element is connected to the eleventh rotation element.

7. The planetary gear train of claim 6, wherein the fourth rotation element and the tenth rotation element are each selectively connectable to a transmission housing, and
the fifth rotation element is selectively connectable to the transmission housing in a state of being disconnected from the eighth rotation element.

8. The planetary gear train of claim 6, wherein the first rotation element, the second rotation element, and the third rotation element are a first sun gear, a first planet carrier, and a first ring gear,
the fourth rotation element, the fifth rotation element, and the sixth rotation element are a second sun gear, a second planet carrier, and a second ring gear,
the seventh rotation element, the eighth rotation element, and the ninth rotation element are a third sun gear, a third planet carrier, and a third ring gear, and
the tenth rotation element, the eleventh rotation element, and the twelfth rotation element are a fourth sun gear, a fourth planet carrier, and a fourth ring gear, respectively.

9. The planetary gear train of claim 6, wherein the first rotation element, the second rotation element, and the third rotation element are a first sun gear, a first planet carrier, and a first ring gear,
the fourth rotation element, the fifth rotation element, and the sixth rotation element are a second sun gear, a second planet carrier, and a second ring gear,
the seventh rotation element, the eighth rotation element, and the ninth rotation element are a third sun gear, a third planet carrier, and a third ring gear, and
the tenth rotation element, the eleventh rotation element, and the twelfth rotation element are a fourth planet carrier, a fourth ring gear, and a fourth sun gear, respectively.

10. The planetary gear train of claim 7, further comprising:
a first clutch selectively connecting the third rotation element to the eighth rotation element;
a second clutch selectively connecting the sixth rotation element to the eighth rotation element;
a third clutch selectively connecting the second rotation element to the seventh rotation element;
a first brake selectively connecting the fourth rotation element to the transmission housing;
a second brake selectively connecting the fifth rotation element to the transmission housing; and
a third brake selectively connecting the tenth rotation element to the transmission housing.

* * * * *